(12) United States Patent
Sugaya (10) Patent No.: US 9,407,657 B2
(45) Date of Patent: Aug. 2, 2016

(54) USER TERMINAL, UNAUTHORIZED SITE INFORMATION MANAGEMENT SERVER, AND METHOD AND PROGRAM FOR BLOCKING UNAUTHORIZED REQUEST

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 103 days.

(21) Appl. No.: 13/751,254

(22) Filed: Jan. 28, 2013

(65) Prior Publication Data

US 2014/0215569 A1   Jul. 31, 2014

(30) Foreign Application Priority Data

Nov. 12, 2012   (JP) .................... 2012-248865

(51) Int. Cl.
*H04L 29/06*   (2006.01)
(52) U.S. Cl.
CPC ........ *H04L 63/1441* (2013.01); *H04L 63/0227* (2013.01)
(58) Field of Classification Search
None
See application file for complete search history.

(56) References Cited

U.S. PATENT DOCUMENTS

| | | | |
|---|---|---|---|
| 8,225,401 B2 * | 7/2012 | Sobel et al. ............... 726/23 |
| 2002/0138634 A1 * | 9/2002 | Davis et al. ............... 709/229 |
| 2007/0199054 A1 * | 8/2007 | Florencio ............ H04L 63/1416 726/5 |
| 2007/0261112 A1 * | 11/2007 | Todd et al. ............... 726/11 |
| 2008/0082662 A1 * | 4/2008 | Dandliker et al. ............ 709/225 |
| 2008/0133540 A1 * | 6/2008 | Hubbard ............... H04L 63/101 |
| 2008/0147837 A1 * | 6/2008 | Klein et al. ............... 709/223 |
| 2008/0276313 A1 * | 11/2008 | Kummu ............ H04L 29/12066 726/22 |
| 2009/0044266 A1 * | 2/2009 | Sharp .................... G06F 21/566 726/14 |
| 2009/0271842 A1 * | 10/2009 | Baumhof ......................... 726/1 |
| 2010/0251369 A1 | 9/2010 | Grant |
| 2011/0041058 A1 | 2/2011 | Butler et al. |
| 2011/0078309 A1 * | 3/2011 | Bloch et al. ................... 709/224 |

FOREIGN PATENT DOCUMENTS

| | | |
|---|---|---|
| JP | 2004-227056 | 8/2004 |
| JP | 2005-92305 | 4/2005 |
| JP | 2007-280013 | 10/2007 |
| JP | 2008-532133 A | 8/2008 |
| JP | 2009-110334 | 5/2009 |
| JP | 2011-22886 | 2/2011 |
| KR | 10-0704000 | 3/2007 |
| KR | 10-2010-0048231 | 5/2010 |
| KR | 10-2010-066841 | 6/2010 |

* cited by examiner

*Primary Examiner* — Farid Homayounmehr
*Assistant Examiner* — Henry Tsang
(74) *Attorney, Agent, or Firm* — Lex IP Meister, PLLC (57) ABSTRACT

The transmission of an unauthorized request from a terminal is blocked. It is possible to provide a user terminal which blocks an unauthorized request made by malicious content by detecting the transmission of a request generated in a user terminal, investigating whether the request contains an improper word registered in an improper word database, and inhibiting the transmission of the request when it is determined that the request contains the improper word.

11 Claims, 9 Drawing Sheets

<IMPROPER WORD DICTIONARY TABLE>

| IMPROPER WORD | TYPE | DANGEROUSNESS |
|---|---|---|
| FOREWARNING OF CRIME | ANTISOCIAL | HIGH |
| EXPLOSION | ANTISOCIAL | HIGH |
| ACCOUNT PASSWORD | SECURITY RISK | HIGH |
| ACCOUNT NUMBER | SECURITY RISK | MIDDLE |
| ⋮ | ⋮ | ⋮ |

FIG. 9

<SUSPICION NOTIFICATION RECEIVING HISTORY TABLE>

| ACQUISITION DATA AND TIME | WEBSITE IP | HOSTNAME URI | DANGEROUSNESS |
|---|---|---|---|
| 2011/12/2 11:23:12 | 149.121.61.21 | phishingchuuiYYY.net | 21 |
| 2012/10/13 2:53:22 | 49.58.123.21 | kikennasaitoZZZ.com | 81 |
| 2012/10/14 14:31:04 | 49.58.123.21 | kikennasaitoZZZ.com | 45 |
| ⋮ | ⋮ | ⋮ | ⋮ |

USER TERMINAL, UNAUTHORIZED SITE INFORMATION MANAGEMENT SERVER, AND METHOD AND PROGRAM FOR BLOCKING UNAUTHORIZED REQUEST

CROSS-REFERENCE TO RELATED APPLICATION

The present application claims priority to Japanese Patent Application No. 2012-248865 filed on Nov. 12, 2012, which is incorporated herein by reference as if reproduced in its entirety.

BACKGROUND OF THE INVENTION

The present invention relates to a user terminal, a malicious site information management server, and a method and a program for blocking an unauthorized request.

In recent years, the number of Internet crimes has increased as the Internet has become more popular. Particularly, even though individuals who have little knowledge of security make efforts to not store important information in their computer, they may sometimes be exposed to criminal acts such as hacking, forewarning of crimes, and the like, which are based on computers, thereby becoming involved in cyber-crimes.

For example, malicious sites may be used to be seen as if users provide information for threatening their social status, such as forewarning of crime. Also, so-called "phishing" sites may be copied from a design of, e.g., an Internet banking site as if to be seen as reliable sites, thereby seducing users into inputting their account information.

However, using the Internet is of benefit to computer users. Accordingly, it is required to block a communication that may cause damage to users while continuously using the Internet.

In view of the above, Japanese Patent Application Publication No. 2008-532133 (JP2008-532133A) discloses a system and a method for detecting and alleviating a Trojan horse that disguises itself as a DNS (Domain Name System).

In JP2008-532133A, there is disclosed a disguise detecting method which is performed by receiving an required IP address and a IP request notification related to a desired hostname and detecting whether or not the required IP address is matched with the desired hostname.

The DNS is configured to mainly translate a hostname into an IP address. When a communication destination is defined by using a hostname, the DNS is needed to specify the communication destination by using an IP address. However, when the DNS is tampered with through a malicious software such as a Trojan horse, users may think that they are communicating with a device with a reliable hostname, but may not recognize the fact that their information is actually being transmitted to another device.

According to the method disclosed in JP2008-532133A, such tampering is prevented by detecting whether or not the IP address is adequately related to the hostname that is determined to be a correct hostname. However, the method disclosed in JP2008-532133A can merely prevent the communication destination from being tampered with and may not effectively work in communication with a website designed to perform an unauthorized request while allowing a correct hostname to correspond to an IP address from the first time.

Further, there is a method for preventing so-called cross-site scripting which executes a program on another website as a well-known technique. However, such a method can merely prevent the execution of a program on a browser. If a user clicks on a malicious link disguised as a normal one without recognizing it, such a method cannot block the performance of inherent functions of the browser.

Accordingly, the present inventor paid attention to the point that it is possible to prevent private information from being transmitted to an external terminal by searching whether or not a non-preferable and improper word is contained in all requests that are transmitted to a website by a user and stopping the communications when the non-preferable improper word is contained therein.

SUMMARY

In view of the above, the present invention provides a user terminal which blocks an unauthorized request related to malicious contents by detecting the transmission of a request made in the user terminal to investigate whether or not the request contains an improper word registered in an improper word dictionary, and inhibiting the transmission of the request when the request has the improper word.

The following means are provided in the present invention.

In accordance with a first aspect of the present invention, there is provided a user terminal which includes an improper word dictionary and is communicably connected to a communications terminal through a network, the user terminal comprising: a request detecting means configured to detect a request which is generated in the user terminal to be transmitted to the communications terminal; an improper word investigating means configured to determine whether the detected request contains an improper word registered in the improper word dictionary; and a request transmission inhibiting means configured to inhibit the transmission of the request when it is determined that the request contains the improper word investigating means.

According to the first aspect of the present invention, the user terminal which includes the improper word dictionary and is communicably connected to the communications terminal through the network detects the request which is generated in the user terminal to be transmitted to the communications terminal, determinates whether or not the detected request contains the improper word registered in the improper word dictionary and inhibits the transmission of the request when the request has the improper word.

Although the first aspect of the present invention is in a category of user terminal, the same actions and effects are obtained in the unauthorized remote operation method and program.

In accordance with a second aspect of the present invention, in the user terminal of the first aspect, there is provided a user terminal further including: a user input determining means configured to determine whether the improper word has been actively inputted by a user when it is determined by said improper word investigating means that the request contains the improper word investigating means.

According to the second aspect of the present invention, the user terminal of the first aspect determines whether or not the improper word has been actively inputted by the user when the improper word investigating means determines that the request contains the improper word.

In accordance with a third aspect of the present invention, in the user terminal of the first or second aspect, there is provided a user terminal further including: a transmission permission receiving means configured to receive input of determination on whether to transmit the request from a user when the transmission of the request is inhibited by said request transmission inhibiting means; and a request transmitting means configured to transmit the request, the transmission of which was inhibited, when said transmission permission receiving means receives input of permission for the request transmission from the user.

According to the third aspect of the present invention, the user terminal of the first or second aspect receives the input of determination on whether to transmit the request from the user when the transmission of the request is inhibited, and transmits the request, the transmission of which was inhibited, when the transmission permission receiving means receives the input of permission for the request transmission.

In accordance with a fourth aspect of the present invention, in the user terminal of one of the first to the third aspect, there is provided a user terminal further including: a suspected site notifying means configured to notify a public institution of content of the request and information of a website which is the origination of the request, as a malicious site candidate, in a case that the transmission of the request is inhibited.

According to the fourth aspect of the present invention, the user terminal of one of the first to the third aspect notifies the public institution of the content of the request and information of the suspected website which is the origination of the request, as the malicious site candidate, in the case that the transmission of the request is inhibited.

In accordance with a fifth aspect of the present invention, in the user terminal of one of the first to the fourth aspect, there is provided a user terminal further including: a suspected site transmitting means configured to transmit content of the request and information of a website which is the origination of the request, as a malicious site candidate, to a malicious site information management server which is communicably connected to the user terminal.

According to the fifth aspect of the present invention, the user terminal of one of the first to the fourth aspect transmits the content of the request and the information of the suspected website which is the origination of the request, as the malicious site candidate, to the malicious site information management server which is communicably connected to the user terminal.

In accordance with a sixth aspect of the present invention, there is provided A malicious site information management server which is communicably connected to at least one user terminal of the fifth aspect, comprising: a malicious site candidate storing means configured to store, in a storage unit, the information of the suspected website, transmitted from the user terminal, as a malicious site candidate; a website reliability calculating means configured to calculate reliability of the stored malicious site candidate by using at least one of the number of times of being transmitted of the suspected website and the content of the request which has been transmitted together with the suspected website; and a reliability providing means configured to provide the communications terminal with the calculated reliability of the website upon request from the communications terminal.

According to the sixth aspect of the present invention, a malicious site information management server of the fifth aspect stores, in the storage unit, the information of the suspected website, transmitted from the user terminal, as the malicious site candidate; calculates the reliability of the stored malicious site candidate by using at least one of the number of time of being transmitted of the suspected website and the content of the request that are transmitted together with the suspected website; and provides the communications terminal with the calculated reliability of the website upon the request of the communications terminal.

In accordance with a seventh aspect of the present invention, there is provided a method for blocking an unauthorized request, which is performed by a user terminal that includes an improper word dictionary and is communicably connected to a communications terminal, the method comprising: detecting a request which is generated in the user terminal to be transmitted to the communications terminal; determining whether the detected request contains an improper word registered in the improper word dictionary; and inhibiting the transmission of the request when it is determined that the request contains the improper word.

In accordance with an eighth aspect of the present invention, there is provided a program for blocking an unauthorized request, which is executed by a user terminal that includes an improper word dictionary and is communicably connected to a communications terminal, the method comprising: detecting a request which is generated in the user terminal to be transmitted to the communications terminal; determining whether the detected request contains an improper word registered in the improper word dictionary; and inhibiting the transmission of the request when it is determined that the request contains the improper word.

In accordance with the aspects of the present invention, it is possible to provide a user terminal which blocks an unauthorized request related to malicious contents by detecting the transmission of a request made in the user terminal to investigate whether or not the request has an improper word contained in an improper word dictionary and inhibiting the transmission of the request when the request has the improper word.

DETAILED DESCRIPTION

Hereinafter, an embodiment of the present invention will be described with reference to the accompanying drawings. This embodiment merely is an example, and the technical scope of the present invention is not limited thereto.

[Outline of Unauthorized Request Blocking System 1]

Figure 1:
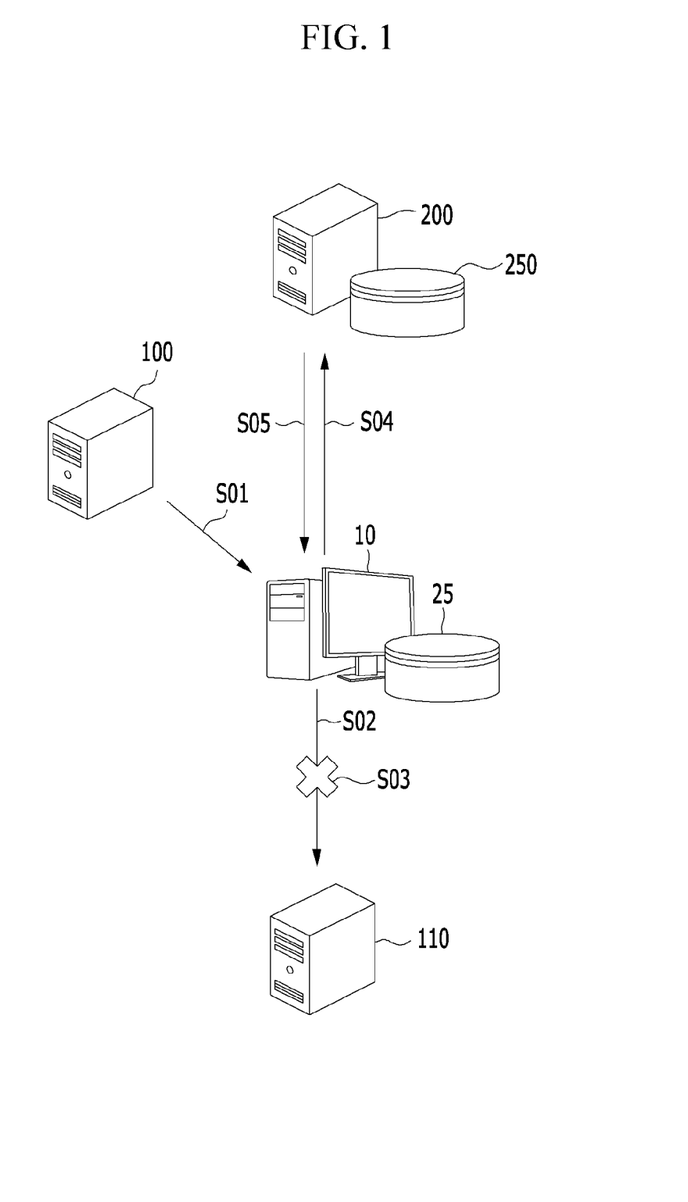
FIG. 1 schematically shows an unauthorized request blocking system 1.

FIG. 1 schematically shows an unauthorized request blocking system 1 in accordance with an exemplary embodiment of the present invention. The unauthorized request blocking system 1 includes a user terminal 10, a malicious site server 100, an information distributing server 110, and an authorized site information management server 200. Based on FIG. 1, the outline of the unauthorized request blocking system 1 will be described as follows.

In the unauthorized request blocking system 1, the user terminal 10 is communicably connected to the malicious site server 100. Further, in the unauthorized request blocking system 1, the user terminal 10 is communicably connected to the information distributing server 110. Furthermore, in the unauthorized request blocking system 1, the user terminal 10 is communicably connected to the malicious site information management server 200.

First, the user terminal 10 reads malicious contents from malicious site server 100 by using a program for reading Internet resources, such as a browser (Step S01). The malicious contents indicate contents that calls an unauthorized request to be described later. In FIG. 1, the malicious site server 100 is surrounded by a dotted line box, indicating that the step S01 may be omitted.

Next, the user terminal 10, based on the malicious contents, writes a request to the information distributing server 110 and tries to transmit the written request thereto (Step 02). In the present embodiment, the request is basically an HTTP request, but the present embodiment is not thereto. The performance of communications with a device conforming to a protocol such as an FTP or an SMTP is defined as "request."

For example, when malicious contents try to post a forewarning of crime on the information distributing server 110 serving as a board without authority, an IP address of the user terminal 10 is specified by a log remaining in the information distributing server 110, so that the specified IP address of the user terminal 10 is erroneously used as a proof that a user of the user terminal 10 posted the forewarning of crime. As another example, when a user inputs an account number or a password into a site disguised as a real Internet banking site by malicious contents without recognizing the disguise, the account number or password of the user falls into the hands of a criminal. The object of the present invention is to protect users from such disadvantage.

Next, in response to the request written in step S02, the user terminal 10 investigates whether or not the request has some of words contained in an improper word database 25 and inhibits the transmission of the request when the request has some improper words contained in the improper word database 25 (step S03). Here, a transmission destination of the request may be the malicious site server 100 without being limited to the information distributing server 110.

The investigation of the request and the inhibition of the request transmission may be performed based on all requests transmitted from the user terminal 10 without being limited to those based on the malicious contents. Accordingly, step S03 may be performed even when step S01 is not performed.

Further, by temporarily storing an input history of an input unit included in the user terminal 10, the user terminal 10 inquiries into the input history to determine whether or not an improper word is actively inputted by a user. As such, particularly, when the request has an improper word which is not actively inputted by the user, it can be determined that the request has highly dangerous contents.

However, most of the requests having improper words are adequate requests. Accordingly, if all of the requests are blocked, it becomes difficult to effectively use Internet resources. Therefore, the user terminal 10 receives input of determination on whether or not to transmit a request, the transmission of which was previously inhibited, by obtaining the reliability of the malicious site server 100 from the malicious site information management server 200 and displaying the obtained reliability to the user.

Specifically, in the case that step S01 is performed, the user terminal 10 transmits, to the malicious site information management server 200, information of the malicious site server 100 and contents of the request of inhibiting the transmission, as a suspicion notification (step S04). Here, in many cases, the request usually has confidential information such as private information. Accordingly, it is required to provide a mechanism, for blocking the wiretapping by encryption or the like, between the user terminal 10 and the malicious site information management server 200.

The malicious site information management server 200 stores, in a suspicion notification receiving history database 250, a hostname or URI (uniform resource identifier) of the malicious site server 100 and the request contents, as the received suspicion notification and then, calculates the reliability of the malicious site server 100 from a suspicion notification receiving history of the same malicious site server 100, which was previously received, to transmit the calculated reliability to the user terminal 10 (step S05).

Further, when receiving a request of the reliability transmission from a terminal that has not transmitted a suspicion notification, unlike step S04, the malicious site information management server 200 may calculate the reliability by using a given IP address or hostname to transmit the calculated reliability to the terminal.

The user terminal 10, which has received the reliability from the malicious site information management server 200, displays the reliability and receives input of determination on whether or not to transmit the request from the user, and then transmits or cancels the request according to the inputted result. Here, in the case that step S01 is not performed, no malicious site server 100 that receives the inquiry of the reliability exists. Accordingly, input may be received without performing step S04 and step S05.

Further, the user terminal 10 may notify a public institution of the reliability received from malicious site information management server 200 or the malicious site server 100 as an improper website in response to the input from the user.

The outline of the unauthorized request blocking system 1 has been described so far.

[System Structure of Unauthorized Request Blocking System 1]

Figure 2:
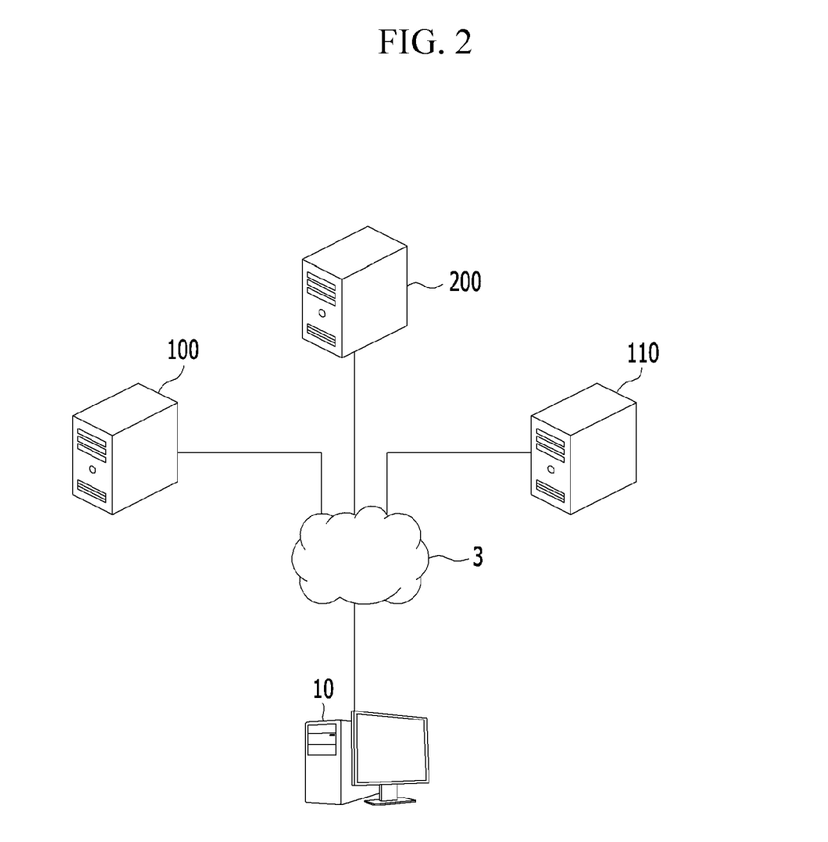
FIG. 2 shows an overall structure of the unauthorized request blocking system 1.

FIG. 2 shows a structure of the unauthorized request blocking system 1 in accordance with the exemplary embodiment of the present invention. The unauthorized request blocking system 1 includes the user terminal 10, the malicious site server 100, the information distributing server 110, the malicious site information management server 200 and a public line network 3 (e.g., Internet network, third or fourth generation communications network, or the like).

The malicious site server 100 is a server which distributes malicious contents causing an unauthorized request to be transmitted from the user terminal 10 or is suspected of performing such an operation. The information distributing server 110 serves to store transmitted information to provide it to users like a bulletin board or an SNS (social networking service).

The malicious site information management server 200 has the following function to accumulate data related to suspicion notifications of malicious sites in order to manage the reliability of every website.

The user terminal 10 is an electronic device for home or business use, which can perform data communications, and includes, e.g., an electronic information appliance such as a portable phone, a portable information terminal, a network terminal, a slate terminal, an electronic dictionary terminal, a portable music player, an audio component, content recording and playback player, a printer, a fax machine, a copy machine, a scanner, and an MFP (multi-functional peripheral device or multi-functional printer), a major appliance (or a white good) such as a refrigerator, a washing machine, a dishwasher, an electric fan, an air conditioner, an electric stove, a cooker and a microwave, electric lighting, a server, a router, a gateway, a NAS (network attached storage), and the like, in addition to a personal computer, a television, a telephone, and a computer.

In the present invention, a communicable connection through the public line network 3 is made between the user terminal 10 and the malicious site server 100, the information distributing server 110 and the malicious site information management server 200. At this time, direct communications do not need to be performed between the malicious site server 100, the information distributing server 110 and the malicious site information management server 200. Further, the communication can be performed through a wire or in a wireless way in the unauthorized request blocking system 1.

[Functions]

Figure 3:
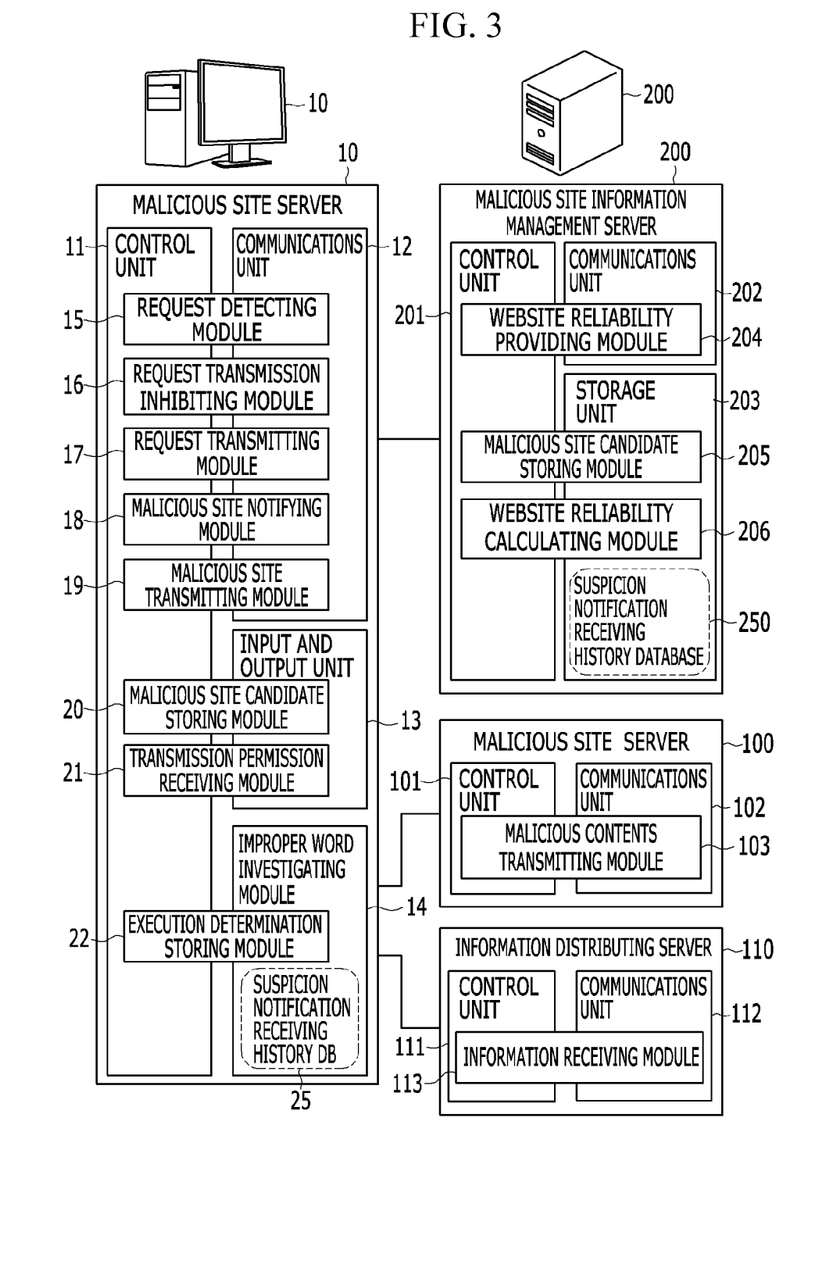
FIG. 3 is a functional block diagram showing a user terminal 10, a malicious site server 100, an information distributing server 110 and a malicious site information management server 200, and relationships therebetween.

FIG. 3 is a functional block diagram showing the user terminal 10, the authorized site server 100, the information distributing server 110 and the malicious site information management server 200, and relationships therebetween.

The user terminal 10 includes a control unit 11 formed of a CPU (central processing unit), a RAM (random access memory), a ROM (read only memory), and the like; a communications unit 12, e.g., a WIFI (wireless fidelity) device conforming to IEEE802.11 or a wireless device conforming to the IMT-2000 standard, such as a third generation mobile communication system; and the like (a LAN connection using a wire is possible).

The user terminal 10 further includes an input and output unit 13 formed of, e.g., a display unit, for outputting and displaying data and/or images controlled by the control unit 11; a touch panel, a keyboard, and a mouse for receiving input from a user or an operator; and the like, and a storage unit 14 such as a data storage formed of a hard disk or a semiconductor memory. In the user terminal 10, the improper word database 25 is stored in the storage unit 14.

In the user terminal 10, as the control unit 11 reads a predetermined program and cooperates with the communications unit 12, a request detecting module 15, a request transmission inhibiting module 16, a request transmitting module 17, a malicious site notifying module 18, and a malicious site transmitting module 19 are realized. Further, in the user terminal 10, as the control unit 11 reads a predetermined program and cooperates with the input and output unit 13, a user input determining module 20 and a transmission permission receiving module 21 are realized. Furthermore, in the user terminal 10, as the control unit 11 reads a predetermined program and cooperates with the storage unit 14, an improper word investigating module 22 is realized.

Similarly, the malicious site information management server 200 includes a control unit 201 formed of a CPU, a RAM, a ROM, and the like; a communications unit 202, e.g., a WIFI (wireless fidelity) device conforming to IEEE802.11 or a wireless device conforming to the IMT-2000 standard, such as a third generation mobile communication system; and the like (a LAN connection using a wire is possible). The malicious site information management server 200 further includes a storage unit 203 such as a data storage formed of a hard disk or a semiconductor memory. In the malicious site information management server 200, the suspicion notification receiving history database 250 is stored in the storage unit 203.

In the malicious site information management server 200, as the control unit 201 reads a predetermined program and cooperates with the communications unit 202, a website reliability providing module 204 is realized. Further, in the malicious site information management server 200, as the control unit 201 reads a predetermined program and cooperates with the storage unit 203, a malicious site candidate storing module 205 and a website reliability calculating module 206 are realized.

Similarly, the malicious site server 100 includes a control unit 101 formed of a CPU, a RAM, a ROM, and the like; a communications unit 102, e.g., a WIFI (wireless fidelity) device conforming to IEEE802.11 or a wireless device conforming to the IMT-2000 standard, such as a third generation mobile communication system; and the like (a LAN connection using a wire is possible).

In the malicious site server 100, as the control unit 101 reads a predetermined program and cooperates with the communications unit 102, a malicious contents transmitting module 103 is realized.

Similarly, the information distributing server 110 includes a control unit 111 formed of a CPU, a RAM, a ROM, and the like; a communications unit 112, e.g., a WIFI (wireless fidelity) device conforming to IEEE802.11 or a wireless device conforming to the IMT-2000 standard, such as a third generation mobile communication system; and the like (a LAN connection using a wire is possible).

In the information distributing server 110, as the control unit 111 reads a predetermined program and cooperates with the communications unit 112, an information receiving module 113 is realized.

[Unauthorized Request Blocking Process]

Figure 4:
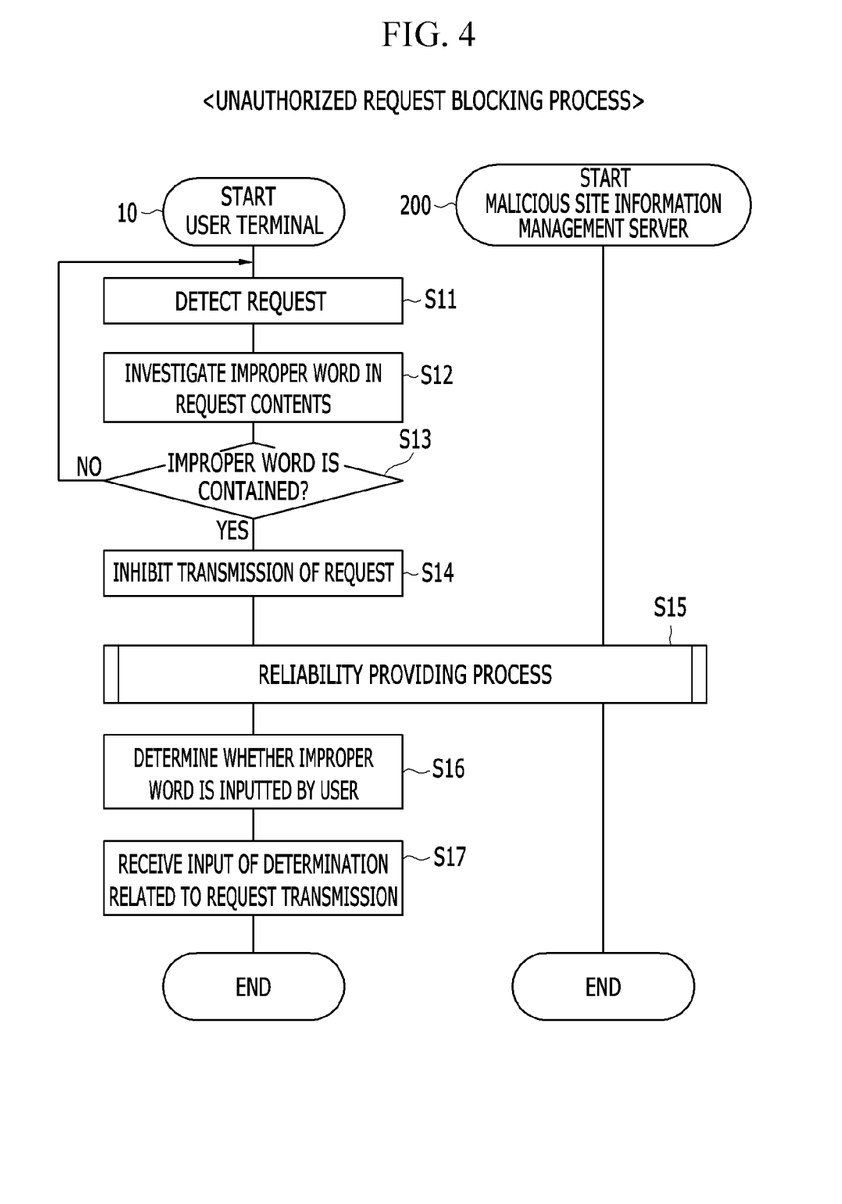
FIG. 4 is a flowchart showing how an authorized request blocking process is performed by the user terminal 10 and the malicious site information management server 200.

FIG. 4 is a flowchart showing how an authorized request blocking process is performed by the user terminal 10 and the malicious site information management server 200. Steps to be executed by the aforementioned modules of each unit will be described together in the present process.

The request detecting module 15 of the user terminal 10 detects a request to be transmitted from the user terminal 10 (step S11). Such detection is preferably performed on the communications based on specific protocols for all various devices regardless of protocols such as HTTP, FTP and SMTP as well as hostnames and ports.

Next, the improper word investigating module 22 of the user terminal 10 investigates whether or not improper words are contained in the contents of the detected request (step S12). Improper words are stored in a dictionary form in the improper word database 25 included in the user terminal 10.

Figure 8:
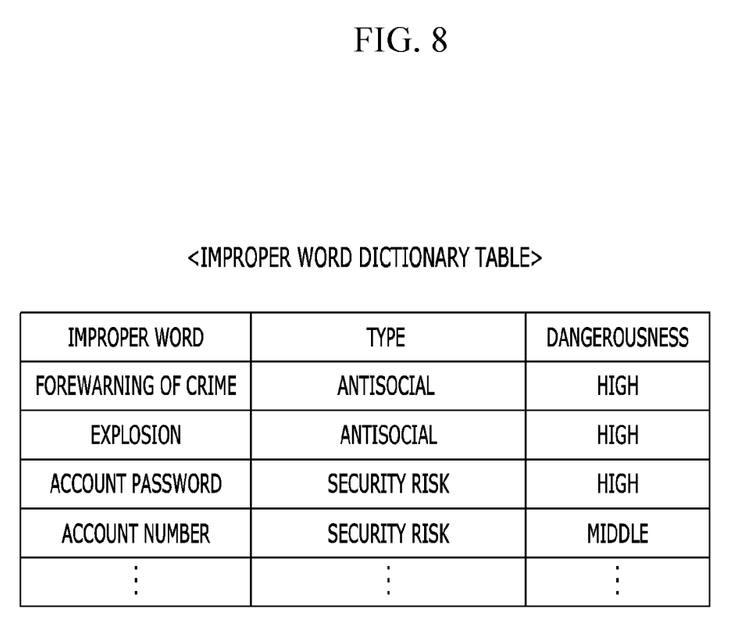
FIG. 8 shows an example of contents of an improper word dictionary table included in an improper word database.

FIG. 8 shows an example of contents of an improper word dictionary table included in the improper word database 25. The improper word dictionary table includes improper words such as "forewarning of crime" and "explosion" and improper word types for showing the dangerousness of each improper word. Further, the dangerousness level may be set for each improper word by using a ratio between a damage that may be caused by an improper word by any possibility and a frequency by which the improper word is adequately used. The dangerousness level may be expressed as figures or categories of high, middle and low.

Here, in the case that the request has no improper word, the request is normally coped with by determining that the request is adequate, and the process returns to step S11 ("No" in step S13). Contrarily, in the case that the request has an improper word, step S14 to be described below is performed by determining that the request may be an unauthorized request ("Yes" in step S13).

When it is determined that the request may be the unauthorized request, the request transmission inhibiting module 16 of the user terminal 10 inhibits the transmission of the request (step S14). This is to prevent information from being distributed to a criminal by allowing the request to be transmitted as it is and received by the information receiving module 113 of the information distributing server 110. However, at this time, the request is not completely canceled, but the transmission of the request is deferred.

Then, the user terminal 10 determines whether or not to receive malicious contents transmitted by the malicious contents transmitting module 103 of the malicious site server 100. However, this step is performed not intentionally but naturally when web browsing, and may not always exist. For example, if there exists a web page, read by a web browser, at a time when the request is made, the page is considered to be a malicious content, and a next step, i.e., a reliability providing process is performed. In the meantime, in the case that there exists no content that is likely to be related to the request, the process skips step S15 and proceeds to step S16. In the present embodiment, when malicious contents exist, the following reliability providing process is performed (step S15).

[Reliability Providing Process]

Figure 5:
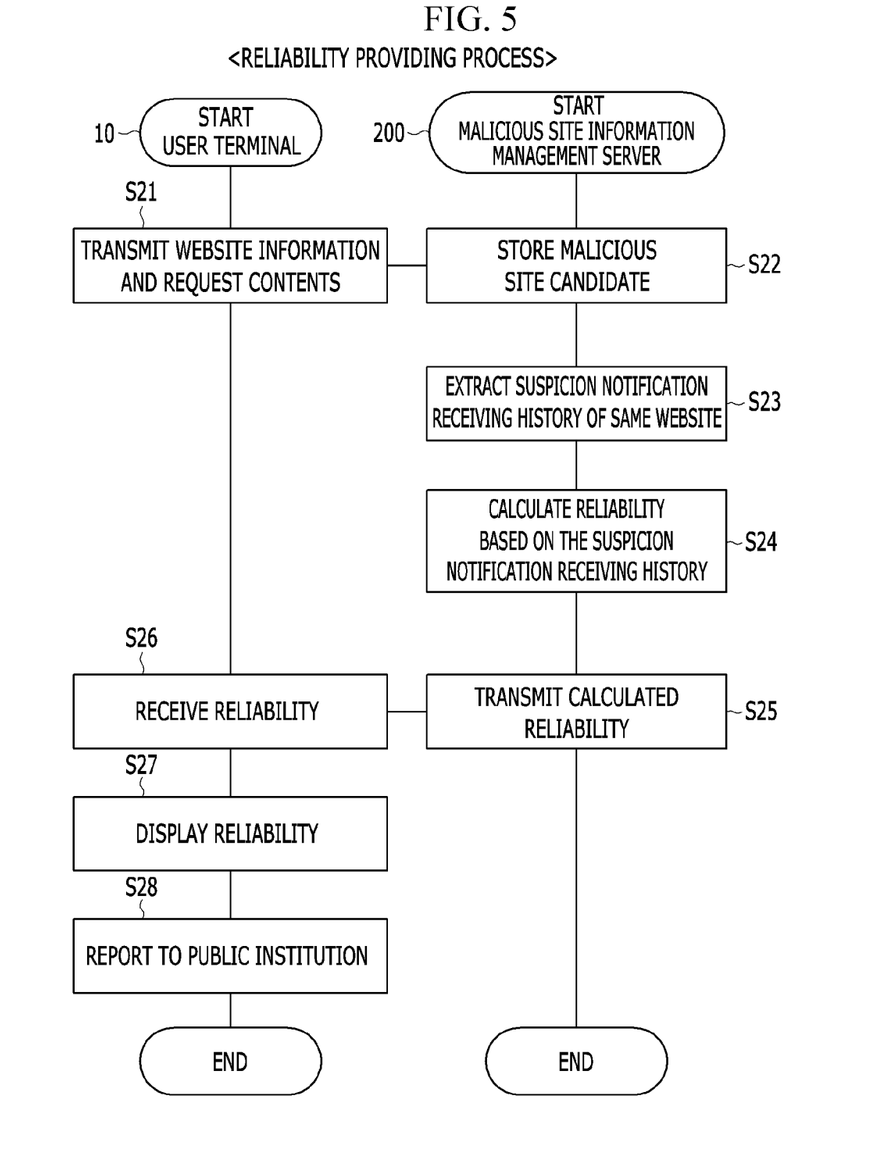
FIG. 5 is a flowchart showing how a reliability providing process is performed by the user terminal 10 and the malicious site information management server 200.

FIG. 5 is a flowchart showing how a reliability providing process is performed by the user terminal 10 and the malicious site information management server 200. Steps to be executed by the aforementioned modules of each unit will be described together in the present process.

First, when there is a suspicion notification related to the malicious contents, the malicious site transmitting module 19 of the user terminal 10 transmits, to the malicious site information management server 200, information of the malicious content and the malicious site server 100, which has transmitted the malicious content, and content of the inhibited request (step S21). Here, the information of the malicious content and the malicious site server 100 includes a hostname thereof, an action URI thereof, an IP address thereof and the like.

Next, the malicious site information management server 200, based on such information, stores, in the suspicion notification receiving history database 250, the website containing the malicious contents as a malicious site candidate (step S22).

Figure 9:
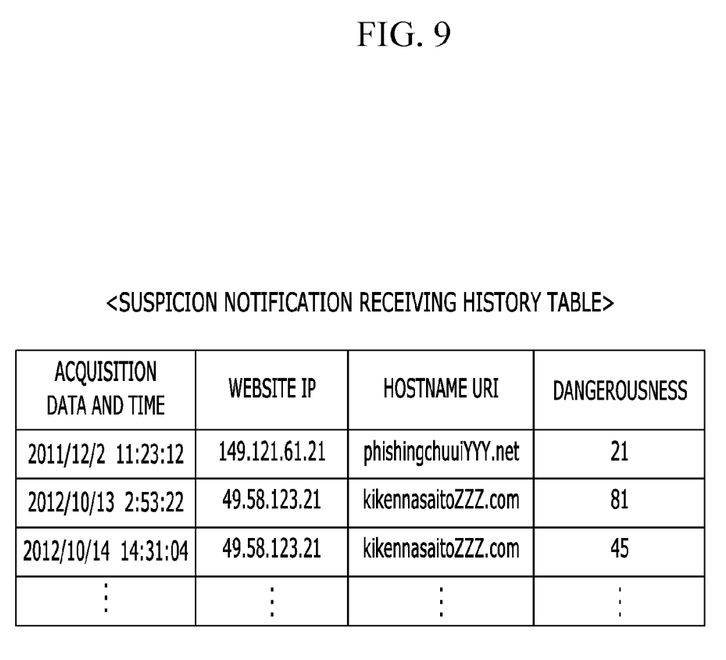
FIG. 9 shows an example of contents of a question receiving history table included in a question receiving history database 250.

FIG. 9 shows an example of contents of a suspicion notification receiving history table included in the suspicion notification receiving history database 250. The suspicion notification receiving history table includes an acquisition date and time, a website IP address, a hostname, an URI and request content dangerousness calculated from the request content. The request content dangerousness may be calculated from the dangerousness of the improper word contained in the request and/or the frequency at which the improper word is used.

Next, the website reliability calculating module 206 of the malicious site information management server 200 extracts data of a website related to a received suspicion notification from the suspicion notification receiving history database 250 (step S23). A plurality of websites may be arranged per hostname and/or IP address to be stored, or information of every website may be stored by using the URI.

Next, the website reliability calculating module 206 calculates the reliability of the website by applying a statistic process to the extracted data (step S24). The dangerousness level of the website may be classified into "danger," "warning," "caution," and "safety" by simply multiplying an average of the request dangerousness by a frequency at which the suspicion notification is received for a certain time period and determining whether or not a thus-obtained value exceeds a predetermined threshold.

Next, the website reliability providing module 204 transmits the calculated reliability to the user terminal 10 (step S25). The user terminal 10 receives the reliability (step S26).

Next, the user terminal 10 displays the received reliability on the display unit thereof (step S27) and receives input of determination on whether to notify a public institution of the website. These days, an organization such as the police performs the cyber patrol to find malicious websites. To that end, the organization may be notified of the malicious websites in many cases.

Figure 7:
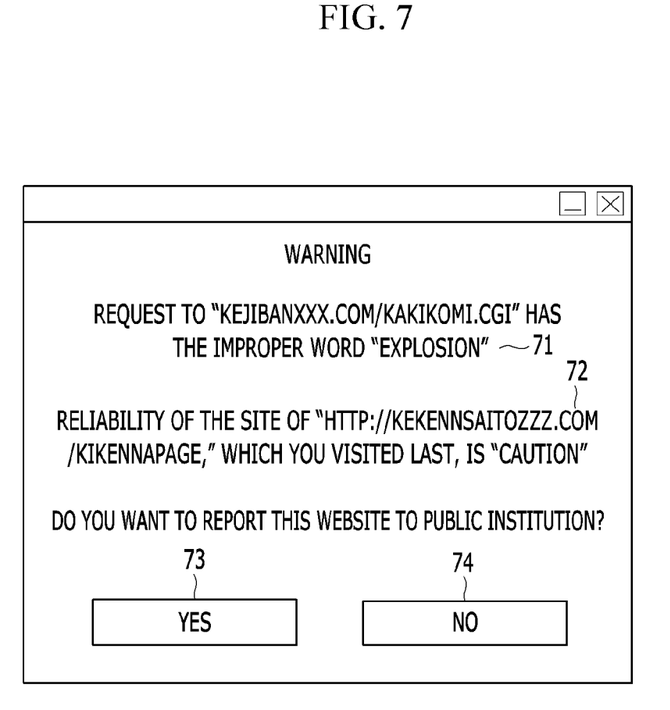
FIG. 7 shows an example of a screen for indicating the reliability of a website and receiving input of determination on whether or not to report the website, displayed in the user terminal 10.

FIG. 7 shows an example of a screen for indicating the reliability of a website and receiving input of determination on whether or not to report the website, displayed in the user terminal 10. In the screen shown in FIG. 7, improper word information 71, and information of a website having a suspicion notification and reliability 72, positioned therebelow, are displayed. The improper word information 71 is contained in the request information or the request, and the reliability 72 is received from the malicious site information management server 200. By selecting a notification button 73 by a user, the website and the above information are notified to the public institution through an E-mail or a predetermined communication (step S28). Contrarily, such notification is not made if a non-notification button 74 is selected.

Returning to the unauthorized request blocking process, the user input determining module 20 of the user terminal 10 determines whether or not the improper word contained in the request is actively inputted by the user (step S16). Such determination of the active input may be made by storing, in a temporary area, e.g., a memory, an input history from the input unit included in the user terminal 10 and, when an improper word is detected, checking whether or not the improper word exists in the input history.

Next, the transmission permission receiving module 21 receives, from the user, input of determination on whether to transmit the request, the transmission of which was previously inhibited (step S17).

Figure 6:
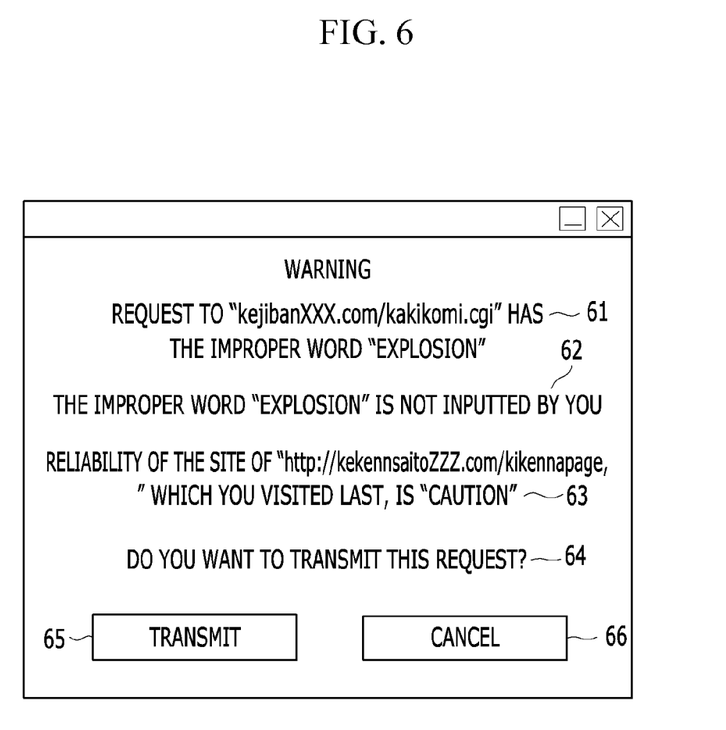
FIG. 6 shows an example of a screen for receiving input of determination on whether or not to transmit a request, displayed in the user terminal 10.

FIG. 6 shows an example of a screen for receiving input of determination on whether or not to transmit a request, displayed in the user terminal 10. In the screen of FIG. 6, improper word information 61 and a message 62 positioned therebelow are displayed. The improper word information 61 is contained in request information or the request, and the message 62 indicates whether or not the improper word is inputted by the user. Also, a permission button 65 indicating the transmission permission and a cancelation button 65 for canceling the request are displayed.

Finally, the user terminal 10 copes with the request depending on the execution determination inputted by the user (step S18). When the user inputs the execution permission, the request transmitting module 17 transmits the request, the transmission of which was previously inhibited. Contrarily, when the user selects cancellation of the request, the request transmission inhibiting module 16 cancels the request without performing the transmission of the request.

The unauthorized request blocking process has been described so far.

The aforementioned means and functions are realized by reading and executing a predetermined program by a computer (including a CPU, an information processing apparatus, and various terminals). The program is recorded in a computer-readable recording medium, e.g., a flexible disk, a CD (e.g., a CD-ROM or the like) and a DVD (e.g., a DVD-ROM, a DVD-RAM, or the like). In this case, the program is read from the recording medium by a computer and transmitted to an internal storage unit or an external storage unit to be stored and executed. Further, the program may be pre-stored in a storage unit (recording medium) such as a magnetic disk, an optical disk, or an optical magnetic disk and transmitted from the recording medium to a computer through a communications line.

Hitherto, although the embodiment of the present invention has been described, the present invention is not limited thereto. Further, the effects described in the embodiment of the present invention are merely most exemplary effects obtained from the present invention, but the effects of the present invention are not limited to those specified in the embodiment of the present invention.

What is claimed is:

1. A user terminal which includes an improper word dictionary and is communicably connected to a communications terminal through a network, the user terminal comprising:
    a request detecting means configured to detect a request which is generated in the user terminal to be transmitted to the communications terminal;
    an improper word investigating means configured to determine whether the detected request contains an improper word registered in the improper word dictionary;
    a memory configured to temporarily store an input history from a user in a temporary area;
    a user input determining means configured to determine whether the improper word has been actively inputted by the user by checking whether or not the improper word exists in the input history when it is determined by said improper word investigating means that the request contains the improper word;
    a transmission permission receiving means configured to display on a screen of the user terminal the improper word, a reliability of a website corresponding to the request, a message representing whether the improper word has been actively inputted by the user, and a message instructing the user to determine whether to permit or cancel the request; and
    a request transmission inhibiting means configured to inhibit the transmission of the request when the transmission permission receiving means receives an input canceling the request from the user.

2. The user terminal of claim 1, further comprising:
    a request transmitting means configured to transmit the request, the transmission of which was inhibited, when said transmission permission receiving means receives an input permitting the request from the user.

3. The user terminal of claim 2, further comprising:
    a suspected site notifying means configured to notify a public institution of content of the request and information of a website which is the origination of the request, as a malicious site candidate, in a case that the transmission of the request is inhibited.

4. The user terminal of claim 2, further comprising:
    a suspected site transmitting means configured to transmit content of the request and information of a website which is the origination of the request, as a malicious site candidate, to a malicious site information management server which is communicably connected to the user terminal.

5. The user terminal of claim 1, further comprising:
    a suspected site notifying means configured to notify a public institution of content of the request and information of a website which is the origination of the request, as a malicious site candidate, in a case that the transmission of the request is inhibited.

6. The user terminal of claim 1, further comprising:
    a suspected site transmitting means configured to transmit content of the request and information of a website which is the origination of the request, as a malicious site candidate, to a malicious site information management server which is communicably connected to the user terminal.

7. A malicious site information management server which is communicably connected to at least one user terminal, the user terminal including an improper word dictionary, a request detecting means configured to detect a request which is generated in the user terminal to be transmitted to a communications terminal, an improper word investigating means configured to determine whether the detected request contains an improper word registered in the improper word dictionary, a memory configured to temporarily store an input history from a user in a temporary area, a user input determining means configured to determine whether the improper word has been actively inputted by the user by checking whether or not the improper word exists in the input history when it is determined by said improper word investigating means that the request contains the improper word, a transmission permission receiving means configured to display on a screen of the user terminal the improper word, a reliability of a website corresponding to the request, a message representing whether the improper word has been actively inputted by the user, and a message instructing the user to determine whether to permit or cancel the request, a request transmission inhibiting means configured to inhibit the transmission of the request when the transmission permission receiving means receives an input canceling the request from the user, and a suspected site transmitting means configured to transmit content of the request and information of a website which is the origination of the request, as a malicious site candidate, to the malicious site information management server, the malicious site information management server comprising:
    a malicious site candidate storing means configured to store, in a storage unit, the information of the suspected website, transmitted from the user terminal, as a malicious site candidate;
    a website reliability calculating means configured to calculate reliability of the stored malicious site candidate by using at least one of the number of times of being transmitted of the suspected website and the content of the request which has been transmitted together with the suspected website; and
    a reliability providing means configured to provide the communications terminal with the calculated reliability of the website upon request from the communications terminal.

8. A malicious site information management server which is communicably connected to at least one user terminal, the user terminal including an improper word dictionary, a request detecting means configured to detect a request which is generated in the user terminal to be transmitted to a communications terminal, an improper word investigating means configured to determine whether the detected request contains an improper word registered in the improper word dictionary, a memory configured to temporarily store an input history from a user in a temporary area, a user input determining means configured to determine whether the improper word has been actively inputted by the user by checking whether or not the improper word exists in the input history when it is determined by said improper word investigating means that the request contains the improper word, a transmission permission receiving means configured to display on a screen of the user terminal the improper word, a reliability of a website corresponding to the request, a message representing whether the improper word has been actively inputted by the user, and a message instructing the user to determine whether to permit or cancel the request, a request transmission inhibiting means configured to inhibit the transmission of the request when the transmission permission receiving means receives an input canceling the request from the user, a request transmitting means configured to transmit the request, the transmission of which was inhibited, when said transmission permission receiving means receives an input permitting the request from the user, and a suspected site transmitting means configured to transmit content of the request and information of a website which is the origination of the request, as a malicious site candidate, to the malicious site information management server, the malicious site information management server comprising:

a malicious site candidate storing means configured to store, in a storage unit, the information of the suspected website, transmitted from the user terminal, as a malicious site candidate;

a website reliability calculating means configured to calculate reliability of the stored malicious site candidate by using at least one of the number of times of being transmitted of the suspected website and the content of the request which has been transmitted together with the suspected website; and     a reliability providing means configured to provide the communications terminal with the calculated reliability of the website upon request from the communications terminal.

9. A malicious site information management server which is communicably connected to at least one user terminal, the user terminal including an improper word dictionary, a request detecting means configured to detect a request which is generated in the user terminal to be transmitted to a communications terminal, an improper word investigating means configured to determine whether the detected request contains an improper word registered in the improper word dictionary, a request transmission inhibiting means configured to inhibit the transmission of the request when it is determined that the request contains the improper word, a memory configured to temporarily store an input history from a user in a temporary area, a user input determining means configured to determine whether the improper word has been actively inputted by the user by checking whether or not the improper word exists in the input history when it is determined by said improper word investigating means that the request contains the improper word, a transmission permission receiving means configured to display on a screen of the user terminal the improper word, a reliability of a website corresponding to the request, a message representing whether the improper word has been actively inputted by the user, and a message instructing the user to determine whether to permit or cancel the request, a request transmitting means configured to transmit the request, the transmission of which was inhibited, when said transmission permission receiving means receives an input permitting the request from the user, and a suspected site transmitting means configured to transmit content of the request and information of a website which is the origination of the request, as a malicious site candidate, to the malicious site information management server, the malicious site information management server comprising:

a malicious site candidate storing means configured to store, in a storage unit, the information of the suspected website, transmitted from the user terminal, as a malicious site candidate;

a website reliability calculating means configured to calculate reliability of the stored malicious site candidate by using at least one of the number of times of being transmitted of the suspected website and the content of the request which has been transmitted together with the suspected website; and     a reliability providing means configured to provide the communications terminal with the calculated reliability of the website upon request from the communications terminal.

10. A method for blocking an unauthorized request, which is performed by a user terminal that includes an improper word dictionary and is communicably connected to a communications terminal, the method comprising:

detecting a request which is generated in the user terminal to be transmitted to the communications terminal;

determining whether the detected request contains an improper word registered in the improper word dictionary;

temporarily storing an input history from a user in a temporary area of a memory;

determining whether the improper word has been actively inputted by the user by checking whether or not the improper word exists in the input history when it is determined by said improper word investigating means that the request contains the improper word;

displaying on a screen of the user terminal the improper word, a reliability of a website corresponding to the request, a message representing whether the improper word has been actively inputted by the user, and a message instructing the user to determine whether to permit or cancel the request; and     inhibiting the transmission of the request when receiving an input canceling the request from the user.

11. A non-transitory computer-readable recording medium that store program for blocking an unauthorized request, which is executed by a processor of a user terminal that includes an improper word dictionary and is communicably connected to a communications terminal, and causes the processor to perform a method comprising:

detecting a request which is generated in the user terminal to be transmitted to the communications terminal;

determining whether the detected request contains an improper word registered in the improper word dictionary;

temporarily storing an input history from a user in a temporary area of a memory;

determining whether the improper word has been actively inputted by the user by checking whether or not the improper word exists in the input history when it is determined by said improper word investigating means that the request contains the improper word;

displaying on a screen of the user terminal the improper word, a reliability of a website corresponding to the request, a message representing whether the improper word has been actively inputted by the user, and a message instructing the user to determine whether to permit or cancel the request; and     inhibiting the transmission of the request when receiving an input canceling the request from the user.

\* \* \* \* \*